United States Patent Office 3,189,575
Patented June 15, 1965

3,189,575
POLYAMIDES STABILIZED WITH ORGANO-TIN COMPOUNDS
Christian F. Horn, Charleston, and Harry Vineyard, South Charleston, W. Va., assignors to Union Carbide Corporation, a corporation of New York
No Drawing. Filed May 4, 1959, Ser. No. 810,525
22 Claims. (Cl. 260—45.75)

This invention relates to the stabilization of polyamides against the degradative effects of light, heat, and air.

Linear, high molecular weight polyamides are well known, and have found extensive use as fibers, films, moldings, extrusions, and the like. These polyamides can be produced from omega-aminocarboxylic acids or their amide-forming derivatives, or from mixtures of suitable diamines and dicarboxylic acids or amide-forming derivatives of these compounds, by condensation at elevated temperatures. The condensation is generally carried out at temperatures above about 200° C., and preferably not in excess of 300° C., in an oxygen-free atmosphere. In most instances, viscosity stabilizers are present during the polymerization to control the molecular weight of the polyamide produced. These well known viscosity stabilizers, however, do not protect the polyamides against the degradative effects of light, moisture, heat and/or oxygen. Such polyamides can be produced as described in U.S. Patent No. 2,071,253, issued to W. H. Carothers on February 16, 1937, and by the processes described in the chapter devoted to polyamides in "Fibers From Synthetic Polymers," Rowland Hill, Elsevier Publishing Company, New York, 1953. This text also presents a clear explanation of the methods used to arrive at the nomenclature of the various polyamides.

The synthetic, high molecular weight, linear polyamides heretofore obtained have been found to be unstable when exposed to light, heat, moisture or atmospheric oxygen. The resulting degradation impairs the physical properties to such an extent that quite often the degraded polymer fails for its intended purpose. This problem is particularly acute in textiles, where a loss in strength caused by degradation will render the fabrics or yarns less useful, and in severe cases completely useless.

It has now been found that linear, high molecular weight polyamides can be protected against the degradative effects of light, heat, moisture, and/or oxygen by adding thereto a stabilizing amount of an organic tin compound which is characterized by the presence therein of at least one direct carbon to tin bond. The polyamides stabilized in this invention are the synthetic linear fiber-forming polyamides in which the —CONH— group is a recurring unit in the polymer chain. Among the polyamides which can be stabilized with the stabilizers of this invention there may be mentioned, specifically, Nylon-6, Nylon-7, Nylon-11, Nylon-6/6, Nylon-6/10, Nylon-12, and the like, as well as mixtures thereof, and other copolyamides. For purposes of illustrating this invention, however, the examples are directed to Nylon-6 and Nylon-7.

Among the many types of organic tin compounds characterized by the presence therein of a direct carbon to tin bond, of which specific representative compounds have been tested and found useful in the methods of this invention, as degradation inhibitors or stabilizers, are:

(A) Tin compounds having four carbon to tin bonds, as represented by the general formula:

$$R_4Sn$$

wherein R represents a hydrocarbon radical or a substituted hydrocarbon radical such as alkyl, cycloalkyl, aralkyl, aryl, alkaryl and alkenyl radicals. Illustrative of such compounds there may be mentioned tetramethyltin, tetraethyltin, tetrapropyltin, tetrabutyltin, tetraoctyltin, tetralauryltin, tetrakis(chloromethyl)tin, tetramethylsulfonylmethyltin, tetracyclohexyltin, tetrabenzyltin, tetrakis(2-phenylethyl)tin, tetraphenyltin, tetra-para-tolyltin, tetra-para-methoxyphenyltin, tetra-para-nitrophenyltin, tetravinyltin, tetraallyltin, as well as unsymmetrical compounds as exemplified by 2-cyanoethyltributyltin, dibutyldiphenyltin and various addition products of alkyl-, aralkyl-, aryl- and alkaryltin hydrides with unsaturated organic compounds such as acrylonitrile, allyl cyanide, crotononitrile, acrylamide, methyl acrylate, allyl alcohol, acrolein diethyl acetal, vinyl acetate, styrene, etc.

(B) Tin compounds having $n$ carbon to tin bonds and $4-n$ intensifying bonds from tin to halogen atoms or to hydrogen atoms or to hydroxyl groups, as represented by the general formula:

$$R_nSnX_{4-n}$$

wherein R represents a hydrocarbon radical or a substituted hydrocarbon radical; X represents a halogen atom, a hydrogen atom or a hydroxyl radical; and $n$ is an integer from 1 to 3. Illustrative of such compounds there may be mentioned trimethyltin chloride, tributyltin chloride, trioctyltin chloride, triphenyltin chloride, trimethyltin bromide, tributyltin fluoride, triallyltin chloride, tributyltin hydride, triphenyltin hydride, trimethyltin hydroxide, tributyltin hydroxide, dimethyltin dichloride, dibutyltin dichloride, dioctyltin dichloride, bis(2-phenylethyl)tin dichloride, diphenyltin dichloride, ditolyltin dichloride, divinyltin dichloride, diallyltin dibromide, diallyltin diiodide, dibutyltin difluoride, bis(carboethoxymethyl)tin diiodide, bis(carbomethoxyethyl)tin dichloride, dibutyltin dihydride, butyltin trichloride, octyltin trichloride, and the like.

(C) Tin compounds having two carbon to tin bonds and an intensifying double bond from tin to oxygen or sulfur, as represented by the general formula:

$$R_2SnY$$

wherein R represents a hydrocarbon radical or a substituted hydrocarbon radical; and Y represents an oxygen or sulfur atom. Illustrative of such compounds there may be mentioned dimethyltin oxide, diethyltin oxide, dibutyltin oxide, dioctyltin oxide, dilauryltin oxide, diphenyltin oxide and diallyltin oxide, all prepared by hydrolysis of the corresponding dihalides, as well as bis(2-phenylethyl)tin oxide, [CH$_3$OCH$_2$(CH$_2$OCH$_2$)$_{x-1}$CH$_2$]$_2$SnO, [CH$_3$OCH$_2$(CH$_2$OCH$_2$)$_{x-1}$CH$_2$O(CH$_2$)$_5$]$_2$SnO and dibutyltin sulfide, the $x$'s being whole integers.

(D) Tin compounds having $n$ carbon to tin bonds and $4-n$ intensifying bonds from tin to oxygen, sulfur, nitrogen or phosphorus linking organic radicals, $n$ being an integer from 1 to 3, such as tributyltin methoxide, tributyltin butoxide, tributyltin acetate, tributyltin N-piperazinylthiocarbonylmercaptide, tributyltin phosphorous dibutoxide(dibutyltributyltin phosphonite) [prepared as indicated immediately below:

$$2(C_4H_9O)_3P + PCl_3 \rightarrow 3(C_4H_9O)_2PCl$$

$$(C_4H_9)_3SnCl + 2Na \rightarrow (C_4H_9)_3SnNa + NaCl$$

$$(C_4H_9)_3SnNa + (C_4H_9O)_2PCl \xrightarrow{NH_3} (C_4H_9)_3SnP(OC_4H_9)_2 + NaCl]$$

dibutyltin dimethoxide, dibutyltin dibutoxide, $$(C_4H_9)_2Sn[OCH_2(CH_2OCH_2)_{x-1}CH_2CH_3]_2$$

dibutyl bis(O-acetylacetonyl)tin, dibutyltin bis(octyl maleate), "Advastab T-50-LT" (a dibutyltin compound found, upon analysis, to contain two ester groups containing carbon, hydrogen and oxygen), "Advastab 17M" (a dibutyltin compound found, upon analysis, to contain an octyl ester of thioacetic connected to tin through sulfur), Argus Mark A and Thermolite 20 [two trade names for dibutyltin bis(thiododecoxide)], dibutyltin bis(octyl thioglycolate), dibutyltin bis(N-morpholinylcarbonylmethylmercaptide), dibutyltin dibenzenesulfonamide, dimethyltin diacetate, diethyltin diacetate, dibutyltin diacetate, dioctyltin diacetate, dilauryltin diacetate, dibutyltin dilaurate, dibutyltin maleate, dibutyltin bis(N-piperazinylthiocarbonylmercaptide), dioctyltin bis(N-piperazinylthiocarbonylmercaptide), octyltin tris(thiobutoxide), butyltin triacetate, and the like.

(E) Polystannic compounds having carbon to tin bonds and intensifying bonds from tin to halogen, hydrogen, oxygen, sulfur, nitrogen or phosphorus, such as HOOSn(CH$_2$)$_x$SnOOH and HOOSnCH$_2$(CH$_2$OCH$_2$)$_x$CH$_2$SnOOH HOOSnC$_4$H$_9$SnOOH, HOOSnC$_8$H$_{16}$SnOOH the $x$'s being positive integers, bis(tributyltin)oxide, dibutyltin basic laurate, dibutyltin basic hexoxide and other polymeric organo-tin compounds containing carbon to tin bonds and preferably also intensifying bonds, e.g., those having repeating

groups, dimers and trimers of (R$_2$SnY)$_n$ and the like in which the R's may be alkyl, aryl or aralkyl radicals and the Y's are chalcogens such as isopropoxystearoxy polystannate, hydroxystearoxy polystannate, poly-(dialkyltin oxides), available under such trade names as "Advastab," "Nuostabe," and "Thermolite."

(F) Stannonic acid compounds having a carbon to tin bond as represented by the general formula:

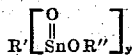

wherein R″ represents hydrogen, or a metal ion, or a hydrocarbon radical or a substituted hydrocarbon radical; R′ represents a monovalent hydrocarbon radical or substituted hydrocarbon radical, and $y$ is an integer having a value of 1. Illustrative of such compounds there may be mentioned methylstannonic acid, ethylstannonic acid, butylstannonic acid, octylstannonic acid, (CH$_3$)$_3$N$^\oplus$(CH$_2$)$_5$SnOOH CH$_3$OCH$_2$(CH$_2$OCH$_2$)$_{x-1}$CH$_2$SnOOH and CH$_3$OCH$_2$(CH$_2$OCH$_2$)$_{x-1}$CH$_2$O(CH$_2$)$_5$SnOOH in which the $x$'s are positive integers, and the like; the metal salts thereof such as the sodium, potassium, magnesium, calcium, zinc, copper, aluminum, boron, titanium, vanadium, chromium, cobalt, nickel, bismuth, manganese, and the like salts; as well as the esters of said stannonic acids such as the methyl, ethyl, propyl, 2-ethylhexyl, dodecyl, and the like esters thereof.

The stabilizing amount of organic tin compound which is characterized by the presence therein of at least one direct carbon to tin bond can be varied from about 0.025 to about 2 percent by weight per 100 parts of polyamide. The preferred stabilizer concentration is from about 0.1 to about 0.25 percent by weight. Smaller or larger amounts can be used if desired, but no significant advantage is to be gained thereby.

The stabilizer can be added to the polyamide after it is formed by any of the conventional procedures, or it can be included in the polymerization mixture prior to the start of the reaction or during the course of the reaction. Inclusion in the reaction mixture before the polyamide is produced is the preferred procedure, and results in the most significant improvements in strength retention or stabilization. It is also within the scope of this invention to employ two or more of the organic tin stabilizers, or one or more of the organic tin stabilizers together with known stabilizers such as chromic acetate, copper salicylate, and the like.

The stabilizing effect of the organic tin compounds characterized by the presence therein of at least one direct carbon to tin bond is determined by comparing the tensile strengths of polyamide yarns which have been stabilized according to this invention with polyamide yarns which have not been so stabilized. The percent strength retention after exposure to light, heat, moisture, and/or oxygen is a measure of the effectiveness of the stabilizers.

The tensile strength was measured according to ASTM Test Method D–1380–55T; either a Scott IP$^2$ machine or an Instron tester were used, both of which are standard pieces of equipment employed in determining tensile strength.

The reduced viscosity (I$_r$) was determined at 30° C. using a phenol-tetrachloroethane (3:2 by weight) solvent with an Ostwald Fenske Cannon type viscometer. The formula for determining the viscosity is:

$$I_r = \frac{N_s - N_b}{N_b} \Big/ \text{Conc.}$$

N$_s$=flow time of solution in seconds
N$_b$=flow time of solvent in seconds
Conc.=0.2 gram of polymer per 100 cc. of solvent The appended examples further illustrate the invention, but are not to be considered limitative thereof. Parts are by weight unless otherwise specified.

EXAMPLE 1

Nylon-7 prepolymer was produced by heating 68.2 parts of ethyl 7-aminoheptanoate and 60 parts of water at 95° to 156° C. for about 4 hours at atmospheric pressure while passing a gentle stream of nitrogen (0.1 liter per minute) through the melt by means of a fine gas sparger fixed at the bottom of the reactor. The molten prepolymer mixture was cooled to room temperature, and the prepolymer was chipped and dried. The solid white Nylon-7 prepolymer had a reduced viscosity of about 0.1.

In the following examples, the Nylon-7 prepolymers used were produced by the above-described procedure.

EXAMPLE 2

There were charged 200 grams of Nylon-7 prepolymer, 1.114 grams of adipic acid as viscosity stabilizer, and 0.2 gram of dibutyltin oxide as degradation inhibitor to a glass condensation vessel equipped with a gas sparger at the bottom of the reactor. The reaction mixture was then heated to 280° C., while a stream of nitrogen was passed through the melt to provide an oxygen-free atmosphere and to afford agitation to facilitate removal of volatile materials formed during the condensation. The reaction mixture was kept at 280° C. for four hours with the nitrogen flow passing through the melt at the following rates: first hour, 0.25 to 1 liter per minute; second hour, 1 to 2 liters per minute; third and fourth hours, 2 to 3 liters per minute. After cooling, the Nylon-7 polymer was removed, chipped, and dried overnight in a vacuum oven at 80° C. The white Nylon-7 had a reduced viscosity of 1.18 and a melting point of 223° C.

The dried polymer chips were melt spun into yarns by conventional procedures on an experimental scale melt spinning machine. The resin was melt spun at 250° C. using a 30 hole 0.015 inch die spinning head, an orifice velocity of 3 feet per minute, and a take-up speed of 150 feet per minute, yielding filaments of about 100 denier.

Control samples of Nylon-7 were prepared using the same procedure as described immediately above, but omitting the dibutyltin oxide degradation inhibitor. These samples are designated A and B in Table I.

Table I lists examples 2 to 19, which were prepared by the procedure described in Example 2. The tensile strengths of the yarns exposed to light were determined on a Scott IP$^2$ machine; whereas the tensile strengths of the yarns exposed to heat and oxygen were determined on an Instron tester. The reduced viscosity values given are those of the Nylon-7 prior to exposure to light, heat, moisture, and/or oxygen.

The light stability of the polyamide was determined after exposure of the yarns for 120 hours in an Atlas Fade-Ometer. Heat and oxygen stability was determined after exposure of the yarns in a 205° C. air circulating oven for the periods of time indicated.

drying in a vacuum oven, the blend was melt spun into yarns as described in Example 2.

EXAMPLE 23

A blend of Nylon-6 having a viscosity of 1.57 and containing 0.2% by weight of dibutyltin oxide was treated and spun into yarns as described in Example 22.

*Table 1*

| Example | A | B | 2 | 3 | 4 | 5 | 6 | 7 | 8 | 9 |
|---|---|---|---|---|---|---|---|---|---|---|
| Nylon-7 prepolymer, g | 4,100 | 200 | 200 | 200 | 200 | 200 | 150 | 150 | 200 | 150 |
| Adipic acid, g | 16.773 | 1.114 | 1.114 | 1.394 | 1.394 | 1.394 | 0.9 | 0.9 | 1.394 | 1.046 |
| Degradation inhibitor, g.: | | | | | | | | | | |
| Dibutyltin oxide | | | 0.2 | 0.1 | 0.4 | 0.4 | 0.75 | 1.5 | | |
| Tetraphenyltin | | | | | | | | | 0.2 | |
| Tetraoctyltin | | | | | | | | | | 0.15 |
| Tributyltin hydroxide | | | | | | | | | | |
| Tributyltin chloride | | | | | | | | | | |
| Dibutyltributyltinphosphonite | | | | | | | | | | |
| Dibutyltin bis-(dilaurylmercaptide) | | | | | | | | | | |
| Dibutyltin dilaurate | | | | | | | | | | |
| Diphenyltin dichloride | | | | | | | | | | |
| Dibutyltin dibenzenesulfonamide | | | | | | | | | | |
| Butyltin trichloride | | | | | | | | | | |
| Octylstannonic acid | | | | | | | | | | |
| Hydroxystearoxy polystannate | | | | | | | | | | |
| Reduced viscosity | 1.46 | 1.40 | 1.18 | 1.30 | 1.21 | 1.41 | 1.25 | 1.19 | 1.14 | 1.10 |
| Light stability, tensile strength, g./denier: | | | | | | | | | | |
| Initial | | 5.00 | 6.11 | 5.30 | 5.60 | 5.30 | 5.30 | 4.30 | 5.00 | |
| After exposure | | 1.01 | 4.91 | 3.20 | 4.90 | 4.60 | 3.40 | 3.45 | 2.00 | |
| Percent retention | | 20.2 | 80.4 | 60.3 | 87.6 | 86.8 | 64.2 | 8.02 | 39.9 | |
| Heat and oxygen stability, tensile strength, g./denier: | | | | | | | | | | |
| Initial | 6.57 | | 5.09 | 4.69 | 4.77 | 4.60 | | | 4.81 | 5.06 |
| After exposure: | | | | | | | | | | |
| 1 hour | 2.66 | | 4.08 | 2.77 | 3.86 | 4.05 | | | 3.85 | 3.49 |
| 4 hours | 1.68 | | | | | | | | | |
| Percent retention: | | | | | | | | | | |
| 1 hour | 40.4 | | 80.0 | 58.9 | 81.0 | 88.0 | | | 80.0 | 69.0 |
| 4 hours | 25.7 | | | | | | | | | |

| Example | 10 | 11 | 12 | 13 | 14 | 15 | 16 | 17 | 18 | 19 |
|---|---|---|---|---|---|---|---|---|---|---|
| Nylon-7 prepolymer, g | 150 | 150 | 150 | 150 | 150 | 150 | 115 | 115 | 150 | 150 |
| Adipic acid, g | 1.046 | 1.046 | 0.669 | 1.046 | 1.046 | 1.046 | 0.948 | 0.948 | 1.046 | 1.046 |
| Degradation inhibitor, g.: | | | | | | | | | | |
| Dibutyltin oxide | | | | | | | | | | |
| Tetraphenyltin | | | | | | | | | | |
| Tetraoctyltin | | | | | | | | | | |
| Tributyltin hydroxide | 0.15 | | | | | | | | | |
| Tributyltin chloride | | 0.15 | | | | | | | | |
| Dibutyltributyltinphosphonite | | | 0.15 | | | | | | | |
| Dibutyltin bis-(dilaurylmercaptide) | | | | 0.15 | | | | | | |
| Dibutyltin dilaurate | | | | | 0.15 | | | | | |
| Diphenyltin dichloride | | | | | | 0.15 | | | | |
| Dibutylin dibenzensulfonamide | | | | | | | 0.115 | | | |
| Butyltin trichloride | | | | | | | | 0.115 | | |
| Octylstannonic acid | | | | | | | | | 0.15 | |
| Hydroxystearoxy polystannate | | | | | | | | | | 0.15 |
| Reduced viscosity | 1.18 | 1.22 | 1.37 | 1.16 | 1.17 | 1.32 | 1.17 | 1.07 | 1.26 | 1.12 |
| Light stability, tensile strength, g./denier: | | | | | | | | | | |
| Initial | 4.00 | 4.30 | 4.52 | 4.30 | 4.10 | 4.80 | 4.90 | 5.70 | 4.50 | 3.50 |
| After exposure | 2.47 | 1.52 | 3.93 | 2.01 | 2.37 | 1.81 | 2.72 | 3.56 | 2.07 | 1.89 |
| Percent retention | 61.7 | 35.3 | 86.8 | 46.6 | 57.8 | 37.7 | 55.4 | 62.3 | 45.8 | 54.0 |
| Heat and oxygen stability, tensile strength, g./denier: | | | | | | | | | | |
| Initial | 3.92 | 4.13 | 3.94 | 3.85 | 4.72 | 4.23 | 4.72 | 4.95 | 4.91 | 3.50 |
| After exposure: | | | | | | | | | | |
| 1 hour | 3.22 | 2.89 | 3.35 | 3.37 | 2.98 | 3.47 | 3.78 | 3.92 | 3.54 | 3.31 |
| 4 hours | | | 1.97 | 2.56 | | | | | | 2.36 |
| Percent retention: | | | | | | | | | | |
| 1 hour | 82.0 | 70.0 | 85.0 | 87.4 | 63.0 | 82.0 | 80.0 | 79.0 | 72.0 | 94.5 |
| 4 hours | | | 50.0 | 66.5 | | | | | | 67.4 |

EXAMPLE 20

A blend of 120 grams of Nylon-7, which had a reduced viscosity of 1.11, and 0.24 gram of dibutyltin oxide was prepared and melt cast into a rod. The rod was then chipped, dried in a vacuum oven, and the dried resin was melt spun into yarns as described in Example 2.

EXAMPLE 21

A blend of Nylon-7 having a reduced viscosity of 1.28 and containing 0.2% by weight of dibutyltin oxide was treated and spun into yarns as described in Example 20.

EXAMPLE 22

A blend of 125 grams of Nylon-7 chips, which had a reduced viscosity of 1.11, and 0.25 gram of dibutyltin oxide was prepared by mixing the two together. After

EXAMPLE 24

A mixture of 200 grams of ethyl 7-aminoheptanoate, 200 grams of water, 0.977 gram of ethyl 6-cyanohexanoate, and 0.08 gram of dibutyltin oxide was heated in a glass reaction vessel at 95° to 105° C. for 3 hours while passing a gentle stream of nitrogen (0.1 liter per minute) through the melt by means of a fine gas sparger fixed at the bottom of the reactor. The temperature was gradually raised to about 200 °C. over a ½ hour period to distill the water and ethanol. The prepolymer in the reaction flask was then heated to 280° C. and converted to high molecular weight Nylon-7 by heating at 280° C. for 4 hours while passing nitrogen through the melt. The Nylon-7 produced was white, and had a reduced viscosity of 1.55.

EXAMPLE 25

In a manner similar to that described in Example 24,

Nylon-7 was produced from a reaction mixture of 200 grams of ethyl 7-aminoheptanoate, 200 grams of water, 0.977 gram of ethyl 6-cyanohexanoate, and 0.1616 gram of dibutyltin oxide.

EXAMPLE 26

In a manner similar to that described in Example 24, Nylon-7 was produced from a reaction mixture of 200 grams of ethyl 7-aminoheptanoate, 200 grams of water, 0.977 gram of ethyl 6-cyanohexanoate, and 0.3232 gram of dibutyltin oxide.

EXAMPLE 27

In a manner similar to that described in Example 24, Nylon-7 was produced from a reaction mixture of 200 grams of ethyl 7-aminoheptanoate, 200 grams of water, 0.977 gram of ethyl 6-cyanohexanoate, and 0.8081 gram of dibutyltin oxide.

The properties of the stabilized polyamides of Examples 20 to 27 are tabulated in Table II. It can be seen that improved stabilization is always achieved regardless of the method used for incorporation of the degradation inhibitor, but that greater stabilization is obtained when the degradation inhibitor or stabilizer is added to the polymerization reaction rather than blended into the preformed resin.

In Table III there are listed Examples 28 to 44, which were prepared in a manner similar to that described in Example 2, except that the inert gas was blown over the surface of the reaction metl rather than through the melt. In all instances 150 grams of Nylon-7 prepolymer, and 0.7758 gram of adipic acid as viscosity stabilizer were charged to the reaction vessel. These examples set forth the results achieved with other stabilizers of this invention.

What is claimed is:

1. A composition of matter comprising a synthetic linear fiber-forming polyamide in which the —CONH— group is a recurring unit in the polymer chain and a stabilizing amount, sufficient to stabilize said composition, of an organic tin compound selected from the group consisting of tin compounds having $n$ carbon to tin bonds and $4-n$ intensifying bonds from tin to a member selected from the group consisting of oxygen, sulfur, nitrogen, and phosphorus linked organic radicals, and wherein $n$ is an integer from 1 to 3.

2. A composition of matter comprising a synthetic linear fiber-forming polyamide in which the —CONH— group is a recurring unit in the polymer chain and a stabilizing amount, sufficient to stabilize said composition, of an organic tin compound selected from the group consisting of polystannic compounds having carbon to tin bonds and intensifying bonds from tin to a member selected from the group consisting of halogen, hydrogen, oxygen, sulfur, nitrogen, and phosphorus.

3. A stabilized composition of matter comprising a synthetic linear fiber-forming polyamide in which the —CONH— group is a recurring unit in the polymer chain and a stabilizing amount, sufficient to stabilize said composition, of an organic tin compound characterized by the presence therein of at least one direct carbon to tin bond selected from the group consisting of (A) tin compounds having four carbon to tin bonds of the formula $R_4Sn$, wherein R is a member selected from the group consisting of hydrocarbon and substituted hydrocarbon radi-

*Table II*

| Example | A | B | 20 | 21 | 22 | 23 | 24 | 25 | 26 | 27 |
|---|---|---|---|---|---|---|---|---|---|---|
| Reduced viscosity | 1.46 | 1.40 | 10.3 | 1.28 | 1.11 | 1.57 | 1.55 | 1.54 | 1.54 | 1.48 |
| Light stability, tensile strength, g./denier: | | | | | | | | | | |
|   Initial | | 5.00 | 4.70 | 5.58 | 5.70 | | 7.06 | 5.66 | 5.61 | 6.14 |
|   After exposure | | 1.01 | 2.42 | 2.23 | 1.93 | | 2.22 | 3.61 | 2.92 | 3.67 |
|   Percent retention | | 20.2 | 51.2 | 40.0 | 33.9 | | 31.3 | 63.8 | 52.1 | 59.8 |
| Heat and oxygen stability, tensile strength, g./denier: | | | | | | | | | | |
|   Initial | 6.57 | | 5.01 | 5.8 | 5.97 | 6.68 | 6.77 | 5.53 | 4.68 | 5.59 |
|   After exposure: | | | | | | | | | | |
|     1 hour | 2.66 | | | | | | 4.7 | 4.29 | 3.67 | |
|     4 hours | 1.69 | | 3.34 | 4.31 | 2.13 | 3.33 | 2.62 | 3.3 | 2.38 | 3.24 |
|   Percent retention: | | | | | | | | | | |
|     1 hour | 40.4 | | | | | | 69.6 | 77.5 | 78.3 | |
|     4 hours | 25.7 | | 66.5 | 74.1 | 35.7 | 50.0 | 38.6 | 59.7 | 51.0 | 58.0 |

*Table III*

| Example | 28 | 29 | 30 | 31 | 32 | 33 | 34 | 35 | 36 | 37 | 38 | 39 | 40 | 41 | 42 | 43 | 44 |
|---|---|---|---|---|---|---|---|---|---|---|---|---|---|---|---|---|---|
| Degradation inhibitor, g.: | | | | | | | | | | | | | | | | | |
|   Dimethyl oxide | 0.2 | | | | | | | | | | | | | | | | |
|   Diphenyltin oxide | | 0.2 | | | | | | | | | | | | | | | |
|   Thermolite 25 | | | 0.2 | | | | | | | | | | | | | | |
|   Dibutyltributyltinphosphonite | | | | 0.2 | | | | | | | | | | | | | |
|   Dibutyltin diacetate | | | | | 0.2 | | | | | | | | | | | | |
|   Dioctyltin maleate | | | | | | 0.2 | | | | | | | | | | | |
|   Tributyltin acetate | | | | | | | 0.2 | | | | | | | | | | |
|   Dioctyltin oxide | | | | | | | | 0.2 | | | | | | | | | |
|   Stannic phosphate | | | | | | | | | 0.2 | | | | | | | | |
|   Stannic phosphate and dibutyltin oxide | | | | | | | | | | 0.1 | | | | | | | |
|   Stannic phosphate and hydroxystearoxy polystannate | | | | | | | | | | | 0.05 / 0.05 | | | | | | |
|   Dibutyltin oxide and dibutyltributyltinphosphonite | | | | | | | | | | | | 0.1 / 0.05 | | | | | |
|   Hydroxystearoxypolystannate and copper salicylate | | | | | | | | | | | | | 0.1 / 0.05 | | | | |
|   Hydroxystearoxypolystannate and chromic acetate | | | | | | | | | | | | | | 0.1 / 0.05 | | | |
|   Hydroxystearoxypolystannate | | | | | | | | | | | | | | | 0.2 | | |
|   Dibutyltin bis-(dilaurylmercaptide) | | | | | | | | | | | | | | | | 0.2 | |
|   Hydroxystearoxy polystannate | | | | | | | | | | | | | | | | | 0.2 |
| Reduced viscosity | 1.39 | 1.54 | 1.56 | 1.59 | 1.22 | 1.36 | 1.25 | 1.39 | 1.51 | 1.41 | 1.36 | 1.15 | 1.27 | 1.23 | 1.35 | 1.48 | 1.41 |
| Light stability, tensile strength, g./denier: | | | | | | | | | | | | | | | | | |
|   Initial | 4.1 | 4.58 | | 7.2 | | 7.2 | 7.0 | | 5.2 | 6.2 | 3.9 | 7.23 | 6.61 | 5.72 | 7.34 | 6.83 | |
|   After exposure | 2.87 | 2.14 | | 5.15 | | 3.48 | 2.58 | | 3.70 | 4.70 | 2.73 | 5.20 | 5.00 | 3.61 | 3.34 | 2.96 | |
|   Percent retention | 70.0 | 46.9 | | 71.5 | | 48.3 | 36.9 | | 71.0 | 75.8 | 70.0 | 71.9 | 75.8 | 63.2 | 45.6 | 43.3 | |
| Heat and oxygen stability tensile strength, g./denier: | | | | | | | | | | | | | | | | | |
|   Initial | 3.78 | 4.44 | 4.48 | 6.54 | 5.46 | 5.89 | 5.53 | 6.41 | 4.64 | 5.59 | 4.64 | 6.94 | 6.38 | 5.13 | 6.3 | 7.5 | 5.0 |
|   After exposure, 4 hours | 3.20 | 3.24 | 2.24 | 3.94 | 3.44 | 3.48 | 3.27 | 3.76 | 4.15 | 3.92 | 3.67 | 3.67 | 4.45 | 3.67 | 4.1 | 3.47 | 3.57 |
|   Percent retention, 4 hours | 84.5 | 72.8 | 49.8 | 60.0 | 63.0 | 59.1 | 59.00 | 58.6 | 89.3 | 70.0 | 78.9 | 52.5 | 69.8 | 71.5 | 65.1 | 46.3 | 71.4 | cals, (B) tin compounds having n carbon to tin bonds and 4−n intensifying bonds from tin to a member selected from the group consisting of halogen, hydrogen, and hydroxyl of the formula $R_nSnX_{4-n}$ wherein X is a member selected from the group consisting of halogen, hydrogen, and hydroxyl, and n is an integer having a value of from 1 to 3, (C) tin compounds having two carbon to tin bonds and an intensifying double bond from tin to a member selected from the group consisting of oxygen and sulfur of the formula $R_2SnY$ wherein Y is a member selected from the group consisting of oxygen and sulfur, (D) tin compounds having n carbon to tin bonds and 4−n intensifying bonds from tin to a member selected from the group consisting of oxygen, sulfur, nitrogen, and phosphorus linked organic radicals, (E) polystannic compounds having carbon to tin bonds and intensifying bonds from tin to a member selected from the group consisting of halogen, hydrogen, oxygen, sulfur, nitrogen, and phosphorus, and (F) stannonic acid compounds of the formula

wherein R″ is a member selected from the group consisting of hydrogen, a metal atom, a hydrocarbon radical, and substituted hydrocarbon radical, R′ is a member selected from the group consisting of monovalent hydrocarbon and substituted monovalent hydrocarbon radicals, and y is an integer having a value of 1.

4. A composition of matter comprising a synthetic linear fiber-forming polyamide in which the —CONH— group is a recurring unit in the polymer chain and from about 0.025 to about 2 percent by weight of an organic tin compound characterized by the presence therein of at least one direct carbon to tin bond selected from the group consisting of (A) tin compounds having four carbon to tin bonds of the formula $R_4Sn$, wherein R is a member selected from the group consisting of hydrocarbon and substituted hydrocarbon radicals, (B) tin compounds having n carbon to tin bonds and 4−n intensifying bonds from tin to a member selected from the group consisting of halogen, hydrogen, and hydroxyl of the formula $R_nSnX_{4-n}$ wheren X is a member selected from the group consisting of halogen, hydrogen, and hydroxyl, and n is an integer having a value of from 1 to 3, (C) tin compounds having two carbon to tin bonds and an intensifying double bond from tin to a member selected from the group consisting of oxygen and sulfur of the formula $R_2SnY$ wherein Y is a member selected from the group consisting of oxygen and sulfur, (D) tin compounds having n carbon to tin bonds and 4−n intensifying bonds from tin to a member selected from the group consisting of oxygen, sulfur, nitrogen, and phosphorus linked organic radicals, (E) polystannic compounds having carbon to tin bonds and intensifying bonds from tin to a member selected from the group consisting of halogen, hydrogen, oxygen, sulfur, nitrogen, and phosphorus, and (F) stannonic acid compounds of the formula

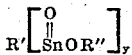

wherein R″ is a member selected from the group consisting of hydrogen, a metal atom, a hydrocarbon radical, and substituted hydrocarbon radical, R′ is a member selected from the group consisting of monovalent hydrocarbon and substituted monovalent hydrocarbon radicals, and y is an integer having a value of 1.

5. A composition of matter comprising a synthetic linear polyamide of 7-aminoheptanoic acid and a stabilizing amount, sufficient to stabilize said composition, of an organic tin compound characterized by the presence therein of at least one direct carbon to tin bond selected from the group consisting of (A) tin compounds having four carbon to tin bonds of the formula $R_4Sn$, wherein R is a member selected from the group consisting of hydrocarbon and substituted hydrocarbon radicals, (B) tin compounds having n carbon to tin bonds and 4−n intensifying bonds from tin to a member selected from the group consisting of halogen, hydrogen, and hydroxyl of the formula $R_nSnX_{4-n}$ wherein X is a member selected from the group consisting of halogen, hydrogen, and hydroxyl, and n is an integer having a value of from 1 to 3, (C) tin compounds having two carbon to tin bonds and an intensifying double bond from tin to a member selected from the group consisting of oxygen and sulfur of the formula $R_2SnY$ wherein Y is a member selected from the group consisting of oxygen and sulfur, (D) tin compounds having n carbon to tin bonds and 4−n intensifying bonds from tin to a member selected from the group consisting of oxygen, sulfur, nitrogen, and phosphorus linked organic radicals, (E) polystannic compounds having carbon to tin bonds and intensifying bonds from tin to a member selected from the group consisting of halogen, hydrogen, oxygen, sulfur, nitrogen, and phosphorus, and (F) stannonic acid compounds of the formula

wherein R″ is a member selected from the group consisting of hydrogen, a metal atom, a hydrocarbon radical, and substituted hydrocarbon radical, R′ is a member selected from the group consisting of monovalent hydrocarbon and substituted monovalent hydrocarbon radicals, and y is an integer having a value of 1.

6. A composition of matter comprising a synthetic linear fiber-forming polyamide in which the —CONH— group is a recurring unit in the polymer chain and a stabilizing amount, sufficient to stabilize said composition, of an organic tin compound selected from the group consisting of tin compounds having four carbon to tin bonds of the formula $R_4Sn$ wherein R is a member selected from the group consisting of hydrocarbon and substituted hydrocarbon radicals.

7. A composition of matter comprising a synthetic linear fiber-forming polyamide in which the —CONH— group is a recurring unit in the polymer chain and a stabilizing amount, sufficient to stabilize said composition, of an organic tin compound selected from the group consisting of tin compounds having n carbon to tin bonds and 4−n intensifying bonds from tin to a member selected from the group consisting of halogen atoms, hydrogen atoms, and hydroxyl groups of the formula $R_nSnX_{4-n}$ wherein R is a member selected from the group consisting of hydrocarbon and substituted hydrocarbon radicals, X is a member selected from the group consisting of halogen, hydrogen, and hydroxyl, and n is an integer having a value of from 1 to 3.

8. A composition of matter comprising a synthetic linear fiber-forming polyamide in which the —CONH— group is a recurring unit in the polymer chain and a stabilizing amount, sufficient to stabilize said composition, of an organic tin compound selected from the group consisting of tin compounds having two carbon to tin bonds and an intensifying double bond from tin to a member selected from the group consisting of oxygen and sulfur atoms of the formula $R_2SnY$ wherein R is a member selected from the group consisting of hydrocarbon and substituted hydrocarbon radicals and Y is a member selected from the group consisting of oxygen and sulfur.

9. A composition of matter comprising a synthetic linear fiber-forming polyamide in which the —CONH— group is a recurring unit in the polymer chain and a stabilizing amount, sufficient to stabilize said composition of an organic tin compound selected from the group consisting of stannonic acid compounds of the formula

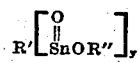

wherein R″ is a member selected from the group consisting of hydrogen, a metal atom, a hydrocarbon radical, and substituted hydrocarbon radical, R' is a member selected from the group consisting of monovalent hydrocarbon and substituted monovalent hydrocarbon radicals, and y is an integer having a value of 1.

10. A composition of matter comprising a synthetic linear fiber-forming polyamide in which the —CONH— group is a recurring unit in the polymer chain and a stabilizing amount, sufficient to stabilize said composition of dibutyltin oxide.

11. A composition of matter comprising a synthetic linear fiber-forming polymadide in which the —CONH— group is a recurring unit in the polymer chain and a stabilizing amount, sufficient to stabilize said composition, of tetroctyltin.

12. A composition of matter comprising a synthetic linear fiber-forming polyamide in which the —CONH— group is a recurring unit in the polymer chain and a stabilizing amount, sufficient to stabilize said composition, of tetraphenyltin.

13. A composition of matter comprising a synthetic linear fiber-forming polyamide in which the —CONH— group is a recurring unit in the polymer chain and a stabilizing amount, sufficient to stabilize said composition, of tributyltin hydroxide.

14. A composition of matter comprising a synthetic linear fiber-forming polyamide in which the —CONH— group is a recurring unit in the polymer chain and a stabilizing amount, sufficient to stabilize said composition, of tributyltin chloride.

15. A composition of matter comprising a synthetic linear fiber-forming polyamide in which the —CONH— group is a recurring unit in the polymer chain and a stabilizing amount, sufficient to stabilize said composition, of dibutyltributyltin phosphonite.

16. A composition of matter comprising a synthetic linear fiber-forming polyamide in which the —CONH— group is a recurring unit in the polymer chain and a stabilizing amount, sufficient to stabilize said composition, of dibutyltin bis-(dilaurylmercaptide).

17. A composition of matter comprising a synthetic linear fiber-forming polyamide in which the —CONH— group is a recurring unit in the polymer chain and a stabilizing amount, sufficient to stabilize said composition, of dibutyltin dichloride.

18. A composition of matter comprising a synthetic linear fiber-forming polyamide in which the —CONH— group is a recurring unit in the polymer chain and a stabilizing amount, sufficient to stabilize said composition, of dibutyltin dilaurate.

19. A composition of matter comprising a synthetic linear fiber-forming polyamide in which the —CONH— group is a recurring unit in the polymer chain and a stabilizing amount, sufficient to stabilize said composition, of dibutyltin dibenzenesulfonamide.

20. A composition of matter comprising a synthetic linear fiber-forming polyamide in which the —CONH— group is a recurring unit in the polymer chain and a stabilizing amount, sufficient to stabilize said composition, of butyltin trichloride.

21. A composition of matter comprising a synthetic linear fiber-forming polyamide in which the —CONH— group is a recurring unit in the polymer chain and a stabilizing amount, sufficient to stabilize said composition, of octylstannonic acid.

22. A composition of matter comprising a synthetic linear fiber-forming polyamide in which the —CONH— group is a recurring unit in the polymer chain and a stabilizing amount, sufficient to stabilize said composition of hydroxystearoxy polystannate.

References Cited by the Examiner

UNITED STATES PATENTS

| | | |
|---|---|---|
| 2,615,860 | 10/52 | Burgess. |
| 2,640,044 | 5/53 | Stamatoff _____ 260—45.7 |
| 2,641,596 | 6/53 | Leistner et al. _____ 260—45.75 |
| 2,665,265 | 1/54 | Burgess. |
| 2,885,415 | 5/59 | Ramsden _____ 260—45.75 |
| 2,891,922 | 6/59 | Johnson _____ 260—45.75 |
| 2,924,586 | 2/60 | Lotz et al. |
| 2,985,621 | 5/61 | Brandes et al. _____ 260—45.75 |
| 3,014,956 | 12/61 | Birum. |
| 3,058,941 | 10/62 | Birum. |
| 3,079,366 | 2/63 | Boyle et al. |

FOREIGN PATENTS

| | | |
|---|---|---|
| 525,590 | 5/56 | Canada. |
| 539,161 | 4/57 | Canada. |
| 539,575 | 4/57 | Canada. |
| 556,925 | 10/43 | Great Britain. |
| 737,508 | 5/53 | Great Britain. |

LEON J. BERCOVITZ, *Primary Examiner.*

A. M. BOETTCHER, A. D. SULLIVAN, MILTON STERMAN, J. R. LIBERMAN, *Examiners.*

UNITED STATES PATENT OFFICE
CERTIFICATE OF CORRECTION

Patent No. 3,189,575 June 15, 1965

Christian F. Horn et al.

It is hereby certified that error appears in the above numbered patent requiring correction and that the said Letters Patent should read as corrected below.

Columns 5 and 6, Table I, ninth column, line 19 thereof, for "8.02" read -- 80.2 --; columns 7 and 8, Table II, fourth column, line 1 thereof, for "10.3" read -- 1.03 --; column 7, line 44, for "metl" read -- melt --.

Signed and sealed this 7th day of December 1965.

(SEAL)
Attest:

ERNEST W. SWIDER
Attesting Officer

EDWARD J. BRENNER
Commissioner of Patents